United States Patent
Elsdon et al.

(10) Patent No.: US 11,995,844 B2
(45) Date of Patent: May 28, 2024

(54) TRACKING IN A MOVING PLATFORM

(71) Applicant: Microsoft Technology Licensing, LLC, Redmond, WA (US)

(72) Inventors: Joshua Aidan Elsdon, Zurich (CH); David John McKinnon, Redmond, WA (US); Salim Sirtkaya, Redmond, WA (US); Marc Andre Leon Pollefeys, Zurich (CH); Douglas Duane Berrett, Seattle, WA (US); Yashar Bahman, Seattle, WA (US); Patrick Markus Misteli, Zurich (CH)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/317,903

(22) Filed: May 15, 2023

(65) Prior Publication Data

US 2023/0281834 A1    Sep. 7, 2023

Related U.S. Application Data

(63) Continuation of application No. 17/246,576, filed on Apr. 30, 2021, now Pat. No. 11,688,080.

(51) Int. Cl.
*G06K 9/00* (2022.01)
*G06T 7/246* (2017.01)
*G06V 20/10* (2022.01)
*G06V 40/20* (2022.01)

(52) U.S. Cl.
CPC ............ *G06T 7/246* (2017.01); *G06V 20/176* (2022.01); *G06V 40/20* (2022.01); *G06T 2200/04* (2013.01); *G06T 2207/10032* (2013.01)

(58) Field of Classification Search
None
See application file for complete search history.

(56) References Cited

PUBLICATIONS

Office Action Received for European Application No. 22721173.7, mailed on Dec. 7, 2023, 3 pages.

*Primary Examiner* — Soo Jin Park
(74) *Attorney, Agent, or Firm* — Barta Jones, PLLC

(57) ABSTRACT

A method of tracking 3D position and orientation of an entity in a moving platform is described. The method comprises receiving data sensed by an inertial measurement unit mounted on the entity. Visual tracking data is also received, computed from images depicting the moving platform or the entity in the moving platform. The method computes the 3D position and orientation of the entity by estimating a plurality of states using the visual tracking data and the data sensed by the inertial measurement unit, where the states comprise both states of the moving platform and states of the entity.

20 Claims, 14 Drawing Sheets

TRACKING IN A MOVING PLATFORM

CROSS-REFERENCE TO RELATED APPLICATION

This non-provisional utility application is a continuation of U.S. application Ser. No. 17/246,576 entitled "TRACKING IN A MOVING PLATFORM" and filed on Apr. 30, 2021, which is incorporated herein in its entirety by reference.

BACKGROUND

Moving platforms such as oil rigs, ships, aircraft, elevators, vehicles, buses, trams, trains are relatively common environments and are in widespread use and yet these are very challenging environments in which to operate tracking apparatus. Tracking apparatus uses sensor data of various types in order to compute three-dimensional (3D) position and orientation of an entity in the environment. Existing tracking apparatus typically performs extremely poorly where the entity being tracked is in a moving platform.

Tracking 3D position and orientation of entities such as drones, unmanned aerial vehicles, robots, people, hands, manufacturing equipment with moving parts, is useful for many purposes. The tracked 3D position and orientation is usable to control a robot, drone, unmanned aerial vehicle or other apparatus. It is also useable to control user interfaces, to control game apparatus, to control placement of holograms in mixed-reality and virtual reality and for other purposes.

The embodiments described below are not limited to implementations which solve any or all of the disadvantages of known tracking apparatus.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a method of tracking 3D position and orientation of an entity in a moving platform. The method comprises receiving data sensed by an inertial measurement unit mounted on the entity. Visual tracking data is also received, computed from images depicting the moving platform or the entity in the moving platform. The method computes the 3D position and orientation of the entity by estimating a plurality of states using the visual tracking data and the data sensed by the inertial measurement unit, where the states comprise both states of the moving platform and states of the entity.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1A:
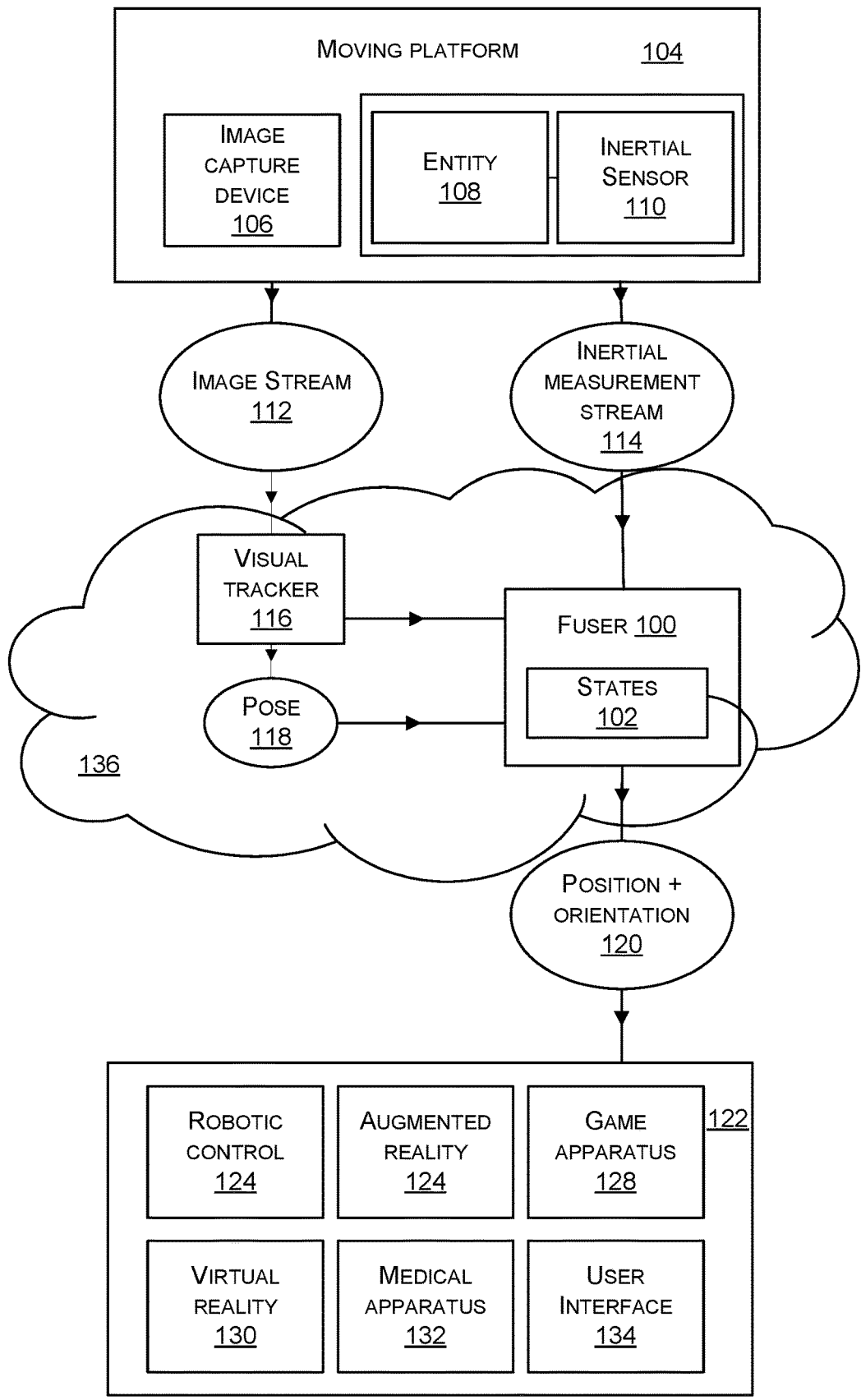
FIG. 1A is a schematic diagram of a fuser which computes position and orientation of an entity in a moving platform.

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples As mentioned above existing tracking apparatus typically performs extremely poorly where the entity being tracked is in a moving platform. As a result there is break down of control of downstream systems which rely on accuracy of the tracking. The consequences are severe in the case of robotic control, control of drones and similar equipment since inaccurate tracking of the robot or drone's 3D position and orientation can lead to collisions and damage. In the case of control of user interfaces, game apparatus, medical apparatus, where tracking accuracy is used to control the user interface, game or medical apparatus there are similar problems. In the case of head-mounted displays for mixed reality, virtual reality or other applications, inaccurate tracking of 3D position and orientation of the head-mounted display leads to failure of the generated displays.

The inventors have recognized that by taking into account both states of the moving platform and states of the entity it is possible to improve tracking performance of entities on moving platforms.

FIG. 1 is a schematic diagram of a fuser 100 deployed as a cloud service to compute 3D position and orientation, and optionally other parameters such as velocity, acceleration, gravity, of an entity 108 in a moving platform 104. 3D position and orientation is computed with 6 degrees of freedom in some examples. A non-exhaustive list of examples of moving platform is: oil rig, ship, aircraft, elevator, vehicle, bus, tram, train, spacecraft, space station, submarine. A non-exhaustive list of examples of entity is: head-mounted display, drone, robot, unmanned aerial vehicle (UAV).

The fuser 100 is computer-implemented using one or more of: software, hardware, firmware and it computes an estimate of values of one or more states 102 by computing a trajectory of the values, also referred to as state propagation. The values of the states comprise, or are used to compute, the 3D position and orientation of the entity and optionally other parameters such as velocity, acceleration, gravity. The fuser takes input from two or more independent sources and uses the input as part of the state propagation. The sources comprise data sensed by an inertial measurement unit (IMU) mounted on the entity, referred to herein as an entity IMU. The sources also comprise visual tracking data which is 3D position and orientation data computed from an image stream 112 of images depicting the moving platform or the entity in the moving platform.

In contrast to other approaches, the fuser takes into account both states of the moving platform and states of the entity. In this way the fuser is able to allow for the moving platform and improve tracking performance.

As shown in FIG. 1 the entity 108 is in or on a moving platform 104 and the entity has an inertial sensor 110 also referred to as an entity IMU. The entity IMU is mounted on the entity 108. The entity IMU comprises any one or more of: accelerometer, gyroscope, magnetometer. In an example there is one accelerometer, gyroscope and magnetometer per axis for each of pitch, roll and yaw. In some cases the entity IMU is an IMU-enabled global positioning system (GPS) device.

At least one image capture device 106 is mounted on the entity 108 or mounted on the moving platform 104. A non-exhaustive list of examples of image capture device is: depth camera, stereo camera, video camera, red green blue (RGB) camera, digital camera, web camera, infra-red camera, time of flight camera.

Where the image capture device is mounted on the entity 108 the image capture device captures images depicting a field of view of the entity. Since the entity is on the moving platform 104 the images depict the moving platform. If the field of view also includes environment outside the moving platform, such as through a window, the images depict the moving platform and external environment.

Where the image capture device is mounted on the moving platform 104 the image capture device captures images depicting the moving platform and the entity 108 on the moving platform.

An image stream 112 from the image capture device 106 is communicated to a visual tracker 116 which in the example of FIG. 1A is deployed in the cloud with the fuser 100. The visual tracker computes 3D position and orientation (pose 118 in FIG. 1A) of the entity from the image stream 112. Any suitable visual tracker technology is used and an example is given below with reference to FIG. 8. In an example, the visual tracker has a 3D model of the moving platform and computes the pose 118 of the entity by fitting the observed data (image stream 112) to the model using an optimization. The 3D model of the moving platform is available in advance or is computed by the visual tracker from the image stream 112. Optionally, the data computed by the fuser 100 is fed back to the visual tracker 116 to improve operation of the visual tracker 116. The data computed by the fuser 100 is used to correct drift in the output of the visual tracker 116.

The output of the fuser 100 comprises 3D position and orientation 120 of the entity 108 and optionally other parameters such as one or more of: velocity, acceleration, gravity. The fuser output is made available to a downstream apparatus 122 such as a robotic control 124 apparatus, an augmented reality apparatus 126, a game apparatus 128, a virtual reality apparatus 130, a medical apparatus 132 a user interface 134. Other types of downstream apparatus 122 are usable. The output of the fuser 100 is used to control movement of the entity in the moving platform in some cases, such as where the entity is a drone or robot.

In the example of FIG. 1A the visual tracker 116 and fuser 100 are deployed in the cloud or any communications network 136 which is in communication with the image capture device 106 and entity IMU.

In other examples the functionality of the visual tracker 116 and fuser 100 is shared between the entity 108 and the cloud deployment.

In some examples the visual tracker 116 and the fuser 100 are integral with the entity 108.

By taking into account both states of the moving platform and states of the entity the fuser operates in an unconventional manner to accurately track 3D position and orientation of an entity on a moving platform.

Using moving platform states and states of the entity improves the functioning of the underlying computing device by enabling more accurate tracking of an entity on a moving platform.

Alternatively, or in addition, the functionality of the fuser is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

In the embodiments of FIG. 1A the fuser is able to take into account states of the moving platform as well as states of the entity when it computes the 3D position and orientation of the entity 108 on the moving platform 104. The result is more accurate tracking of the entity 108 on the moving platform as compared with approaches where only states of the entity 108 are taken into account, or where states of the moving platform are not considered. In the embodiments of FIG. 1A, even though the fuser takes into account states of the moving platform, it has limited observed data about the states of the moving platform. The observed data available in the situation of FIG. 1A includes the image stream 112 and the inertial measurement stream 114 from the entity IMU. Thus the observed data has little about the moving platform itself. Thus the states of the moving platform are inferred by the fuser from the observed data which is available.

Figure 1B:
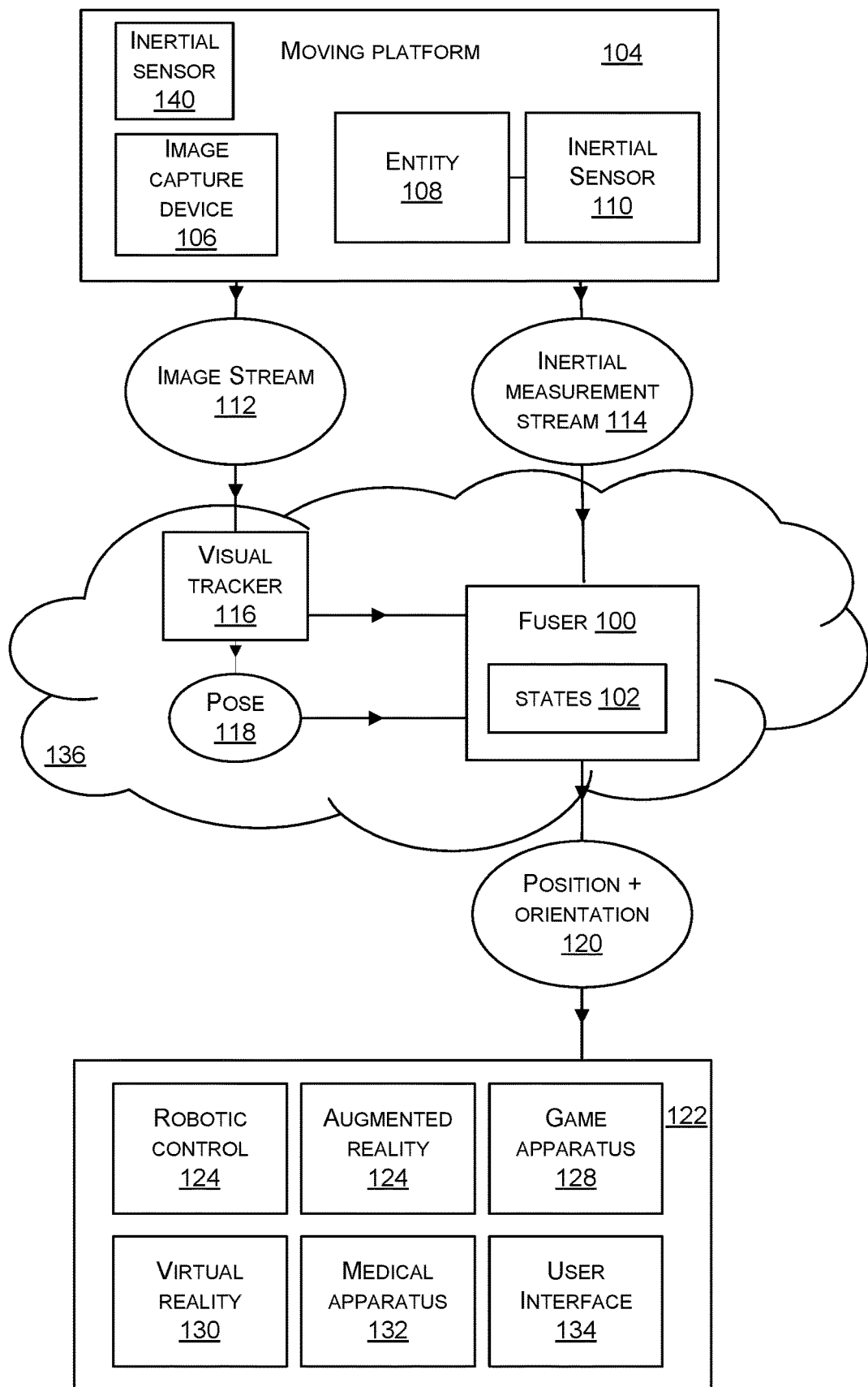
FIG. 1B is another schematic diagram of a fuser which computes position and orientation of an entity in a moving platform, and where the moving platform has a tied inertial measurement unit.

FIG. 1B is the same as FIG. 1A except that there is an additional IMU and the fuser takes another source of input (which is from the additional IMU). In the embodiments of FIG. 1B there is an additional IMU shown as inertial sensor 140 (also referred to herein as the platform IMU), which is mounted on the moving platform. The inertial sensor 140 is an IMU comprising any one or more of: accelerometer, gyroscope, magnetometer. In an example there is one accelerometer, gyroscope and magnetometer per axis for each of pitch, roll and yaw. In some cases the platform IMU is an IMU-enabled global positioning system (GPS) device.

In an example the platform IMU is an IMU of a mobile computing device. The mobile computing device is placed in a holder fixed to the moving platform, such as a pouch in a car seat, a holder on an airplane seat, a recess in a dashboard of a ship.

In the example of FIG. 1B. the fuser 100 uses platform states and entity states. The fuser receives the inertial measurement stream 114 comprising data from the entity IMU as well as data from the platform IMU. The data from the platform IMU is observed data about the platform states used by the fuser 100. The data from the platform IMU comprises measurements with respect to a coordinate frame of the platform IMU. Therefore, in some examples the fuser converts the data from the platform IMU into a coordinate frame compatible with calculations it makes. To do the conversion the fuser uses knowledge of the coordinate frame of the platform IMU. The fuser 100 determines the coordinate frame of the platform IMU in various ways as described in detail later with reference to FIG. 7.

Since the fuser 100 now has observed data about the platform states the accuracy of tracking is improved as compared with the embodiments of FIG. 1A where the platform states are inferred.

The example of FIG. 1B is extendable by adding more platform IMUs at different locations on the platform. The fuser 100 is able to use the data from all the platform IMUs or to select one or more of the platform IMUs according to which are closest to the entity at a given time.

The example of FIG. 1B is extendable by adding more states to the fuser including a 3D position and orientation of the second IMU and a velocity of the second IMU, both expressed in a world reference frame. Where the fuser takes these additional states into account the output of the fuser is world-locked, that is, the tracked position and orientation of the entity is invariant with respect to the moving platform.

Figure 2A:
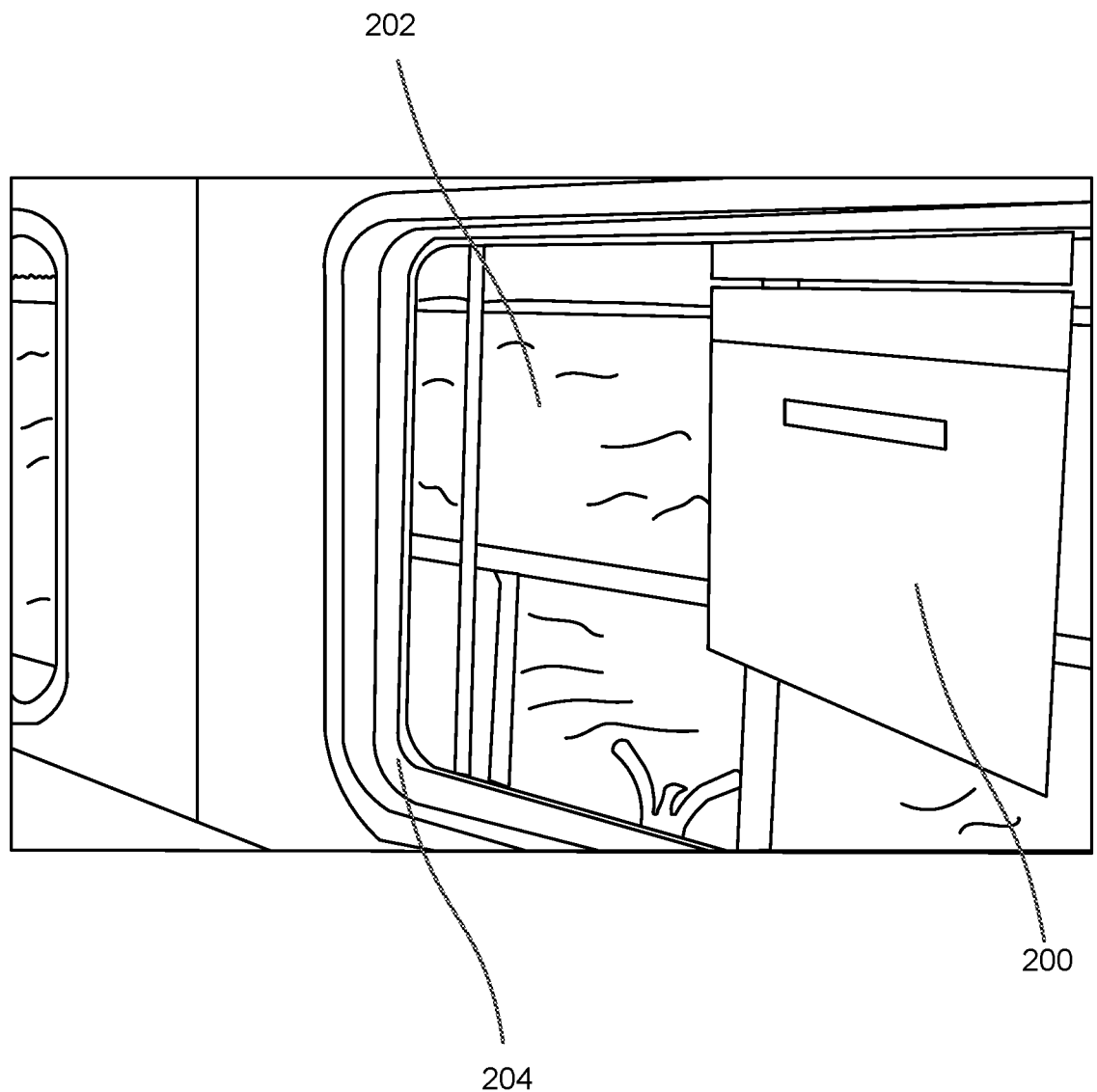
FIG. 2A shows an example where the moving platform is a ship and where tracked position and orientation of a head-mounted display is used to place a hologram which is platform-locked.

FIG. 2A shows an example where the moving platform is a ship and where tracked position and orientation of a head-mounted display is used to place a hologram 200 which is platform-locked. A person wearing a head-mounted display is on a ship and his or her field of view includes an interior of the ship with window frames 204. Through the windows the ocean is visible. The person is able to see a hologram 200 of a user interface projected by the head-mounted display taking into account tracked 3D position and orientation of the head-mounted display. Even though the head-mounted display is on a moving platform, the 3D position and orientation is tracked accurately by taking into account both platform states (i.e. states of the ship) and entity states (i.e. states of the head-mounted display) in the fuser as described above with reference to FIG. 1A. The head-mounted display has an IMU which inputs data to the fuser. The head-mounted display has an image capture device which inputs an image stream to a visual tracker as described with reference to FIG. 1A. The output of the visual tracker goes to the fuser together with the data from the head-mounted display IMU.

The hologram 200 is platform-locked since it appears fixed with respect to the interior of the ship. The platform-locking is achieved by using the tracked 3D position and orientation of the head-mounted display to determine how to project the hologram 200.

Figure 2B:
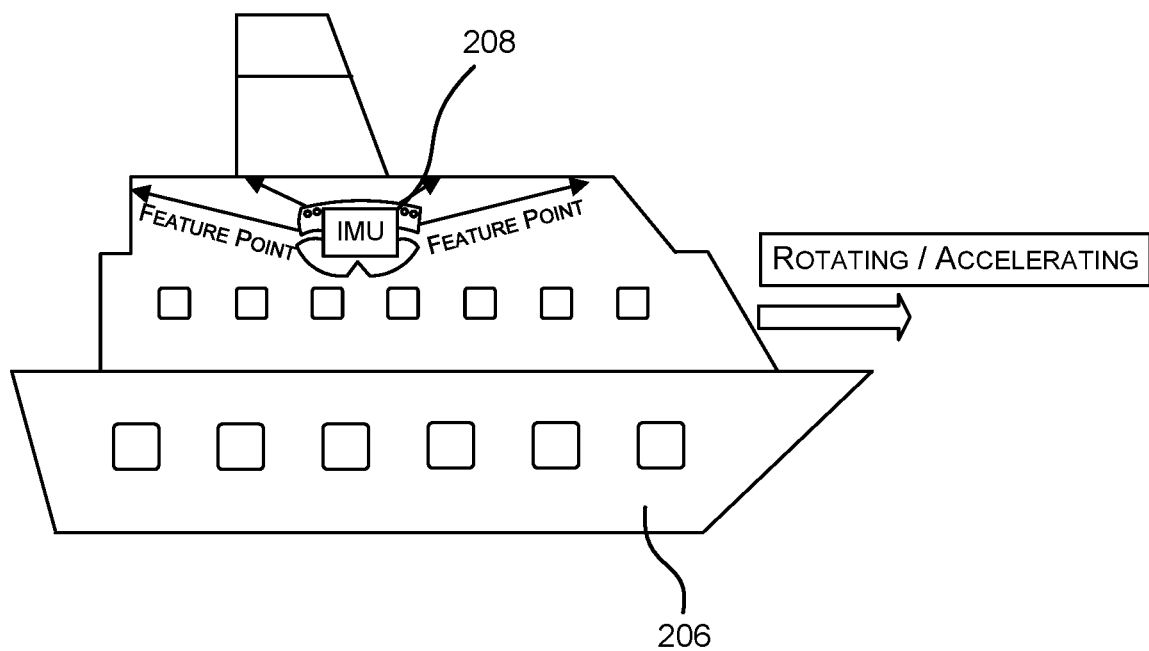
FIG. 2B is a schematic diagram of a ship and a head-mounted display in the ship.

FIG. 2B is a schematic diagram of a ship 206 and a head-mounted display 208 in the ship. The ship 206 is accelerating and/or rotating whereas the head-mounted display 208 in the ship is stationary. Image capture device(s) on the head-mounted display 208 capture images of the interior of the ship 206 and are input to a visual tracker which computes a stationary 3D position and orientation of the head-mounted display 208. An IMU in the head-mounted display 208 senses the ship acceleration and/or rotation. The conflicting information from the IMU in the head-mounted display 208 and the visual tracker causes discrepancy which often results in tracking loss. The inventors have recognized that at least one reason why the tracking loss occurs is inability of the fuser to allow for such discrepancies. The inventors have devised an enhanced fuser which is able to allow for the discrepancies.

Figure 3A:
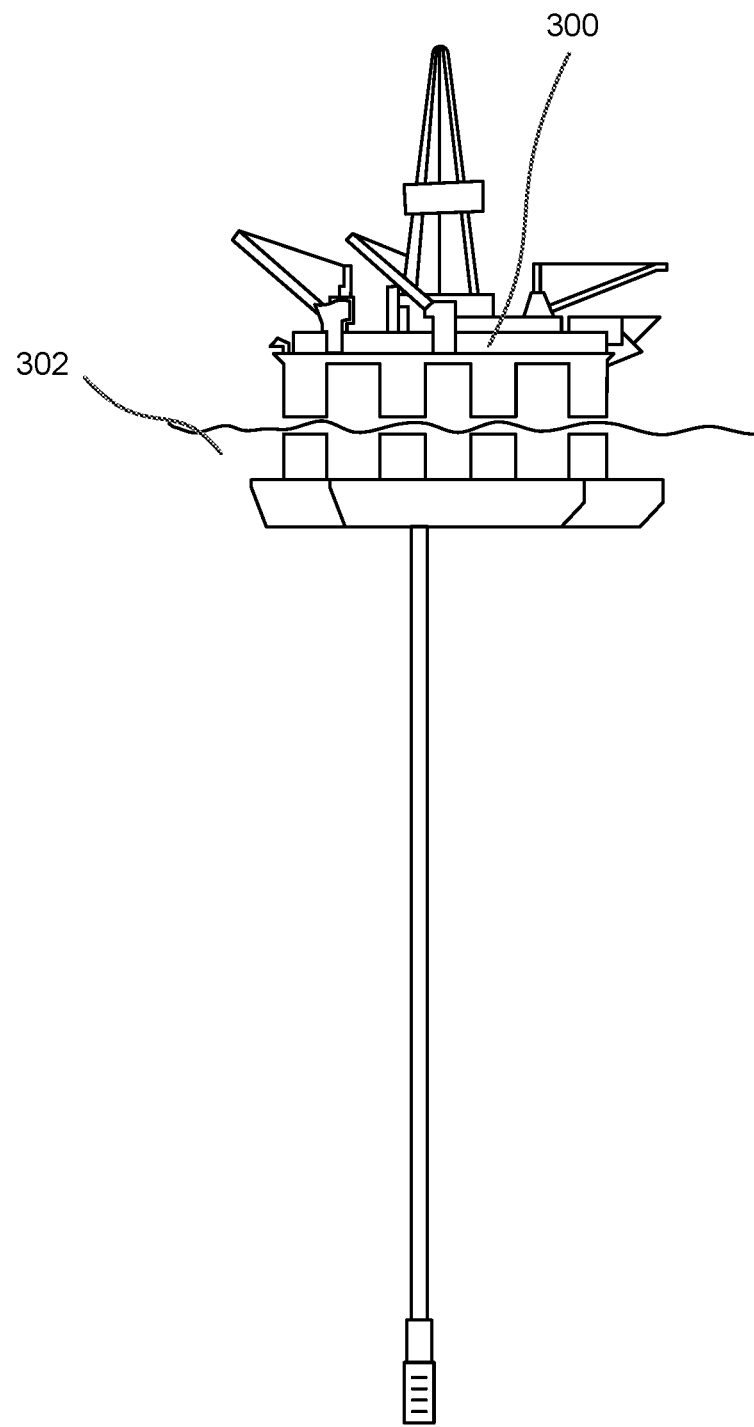
FIG. 3A is a schematic diagram of an oil rig.

FIG. 3A is a schematic diagram of an oil rig 300 comprising a platform supported on a floating structure and anchored to the sea bed. The oil rig 300 moves as a result of motion of the sea 302 although it is anchored to the sea bed.

Figure 3B:
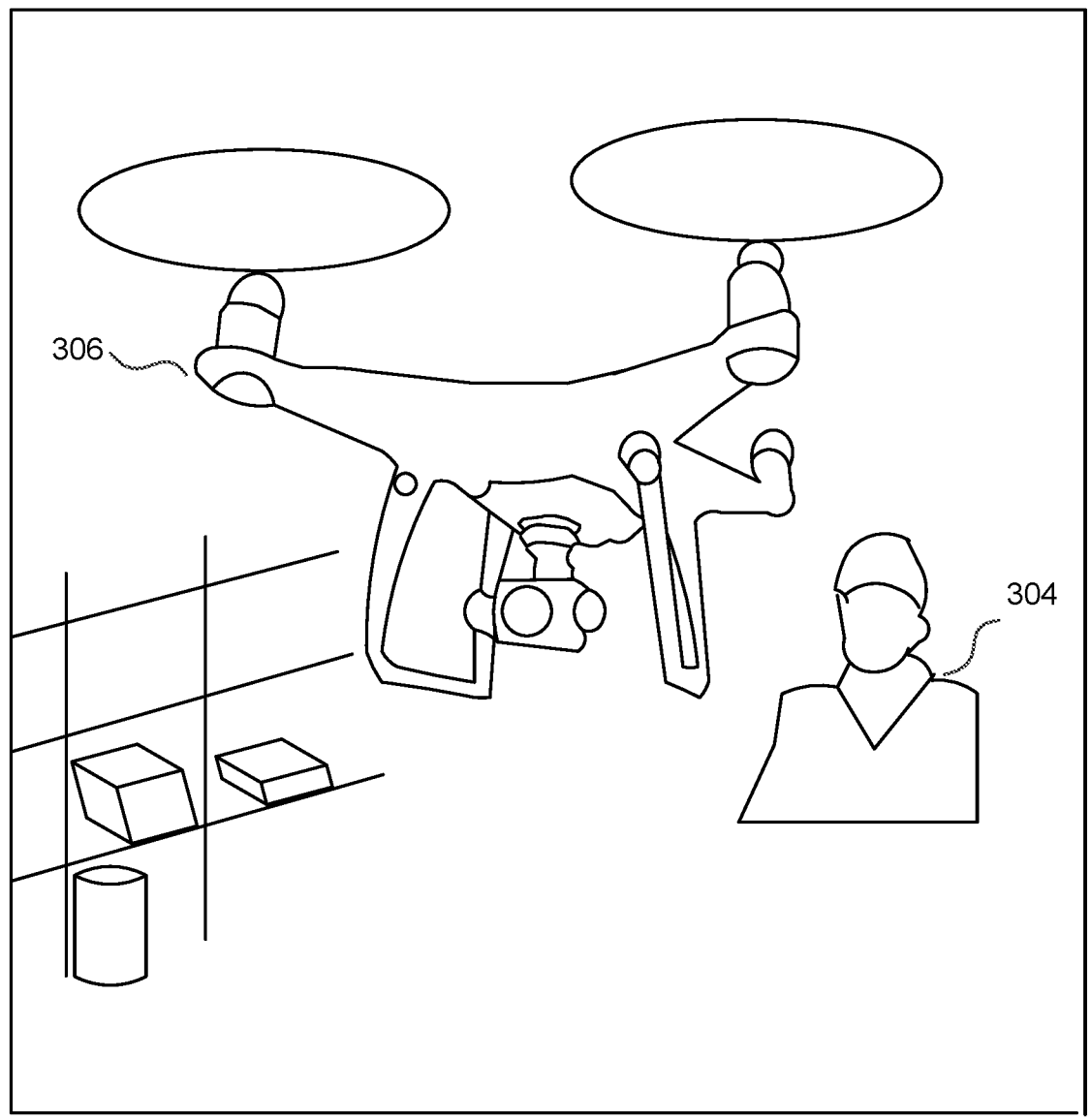
FIG. 3B is a schematic diagram of a drone and a human operator within an interior of the oil rig of FIG. 3A.

FIG. 3B is a schematic diagram of a drone 306 and a human operator 304 within an interior of the oil rig 300 of FIG. 3A. The drone has an IMU and an image capture device 106 both mounted on the drone. Data from the IMU in the drone is sent to a fuser 100 which is either in the cloud, in the drone 306 or at another computer in communication with the drone 306. Data from the image capture device 106 is sent to a visual tracker 116 in the drone 306 or at another computer in communication with the drone 306. The visual tracker computes 3D position and orientation of the drone from the received images and sends the results to the fuser 100. The fuser computes, from the IMU data and the visual tracker output, a 3D position and orientation of the drone. The fuser takes into account states of the drone and states of the oil rig as part of the computation and the resulting tracked 3D position and orientation of the drone is accurate despite the drone being on a moving platform.

Figure 4:
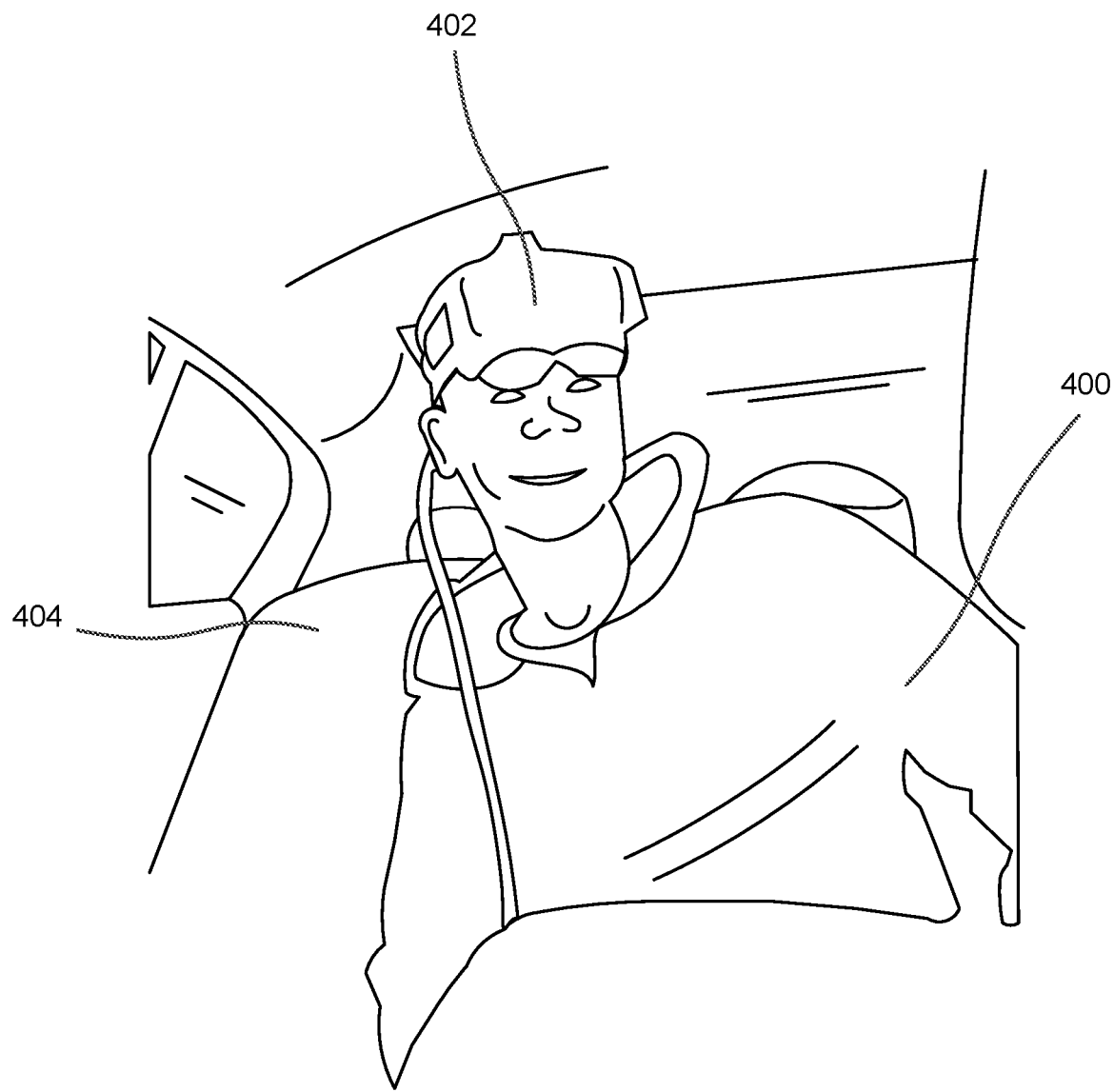
FIG. 4 is a schematic diagram of a passenger in a motor vehicle.

FIG. 4 is a schematic diagram of a passenger 400 in a motor vehicle 404. The passenger is wearing a head-mounted display 402 and the motor vehicle is moving. Thus there is an entity (head-mounted display 402) on a moving platform (motor vehicle 404). The head-mounted display 402 is a mixed-reality wearable computer such as Microsoft HoloLens (trade mark) and incorporates an IMU and at least one image capture device for capturing images of a field of view of the head-mounted display 402.

The head-mounted display 402 incorporates a visual tracker 116 and a fuser 100. The fuser takes into account states of both the head-mounted display and states of the motor vehicle when it computes 3D position and orientation of the head-mounted display. The fuser uses results from the visual tracker and also data sensed by the IMU in the head-mounted display 402. Because the fuser takes into account states of the head-mounted display and states of the motor vehicle it is able to track 3D position and orientation of the head-mounted display in an accurate manner despite motion of the motor vehicle. Having the accurately tracked 3D position and orientation of the head-mounted display enables the head-mounted display to project holograms such that they appear platform-locked i.e. fixed to a 3D location in the motor vehicle, despite motion of the motor vehicle.

The example of FIG. 4 is extended by the passenger having a mobile computing device incorporating an IMU such as a smart phone, tablet computer, smart watch, laptop computer or other mobile computing device. The passenger places the mobile computing device in a fixed location in the motor vehicle. Data sensed by the platform IMU which is the IMU in the mobile computing device is transferred to the head-mounted display by wireless communication, by wired connection, via another computing device or in other ways. The head-mounted display 402 determines a coordinate frame of the platform IMU as described below with reference to FIG. 7. The fuser in the head-mounted display 402 is able to accurately track the 3D position and orientation of the head-mounted display 402 from the IMU data (both platform IMU data and head-mounted display IMU data) and from the visual tracking data by using the platform and entity states.

The example of FIG. 4 is extended further by using more states in the fuser. Where the fuser uses states comprising a 3D position and orientation of the platform IMU and a velocity of the platform IMU, both expressed in a world reference frame, it is possible for the head-mounted display to project world-locked holograms. World-locked holograms in this example are holograms which appear to be in the environment outside the moving motor vehicle, such as holograms in the road.

Figure 5:
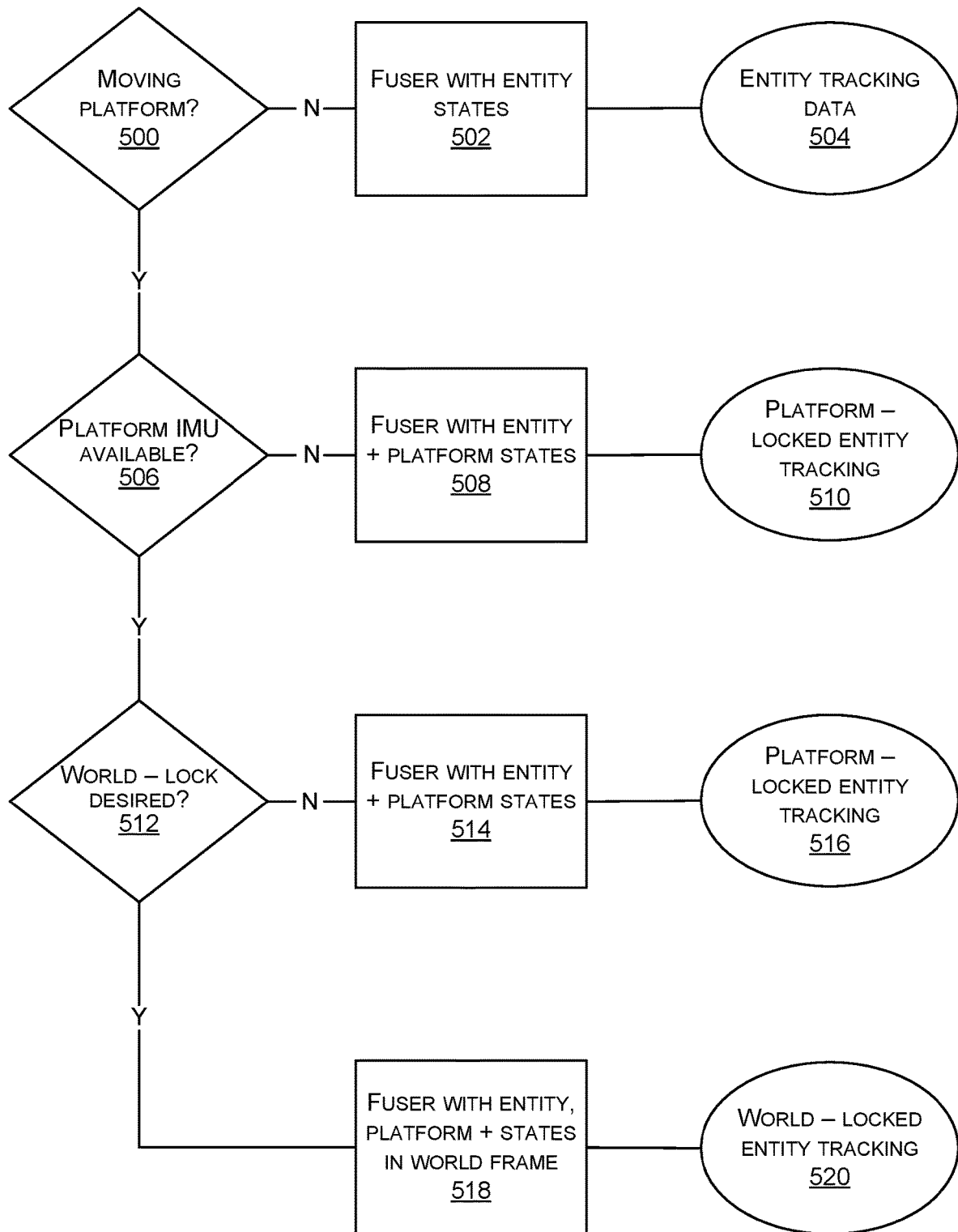
FIG. 5 is a flow diagram of a method performed by a fuser for tracking an entity in a moving platform.

FIG. 5 is a flow diagram of a method performed by a fuser 100 (such as the fuser of FIG. 1) for tracking an entity in a moving platform. The fuser assesses whether it is to enter moving platform mode or not at decision box 500. One or more criteria are used to trigger entry to the moving platform mode and examples of criteria are now given: In an example, the fuser automatically detects when to enter moving platform mode according to a geographical location of the entity detected by a global positioning system, or according to output of the entity IMU. The entity IMU signal is compared with template IMU signals to identify a type of moving platform. In another example a machine learning classifier is trained to classify entity IMU signals according to moving platform or not moving platform. In another example discrepancy between the entity camera images and the entity IMU is used to trigger entry to moving platform mode. In another example the criteria include checking when state e and state l of the fuser become active (these states are explained in detail below). In some cases user input is used to change the mode of the fuser from regular mode to moving platform mode. In regular mode the fuser operates with entity states 502 only and computes entity tracking data 504 from entity IMU data and visual tracking data. In regular mode the entity tracking data 504 is accurate since there is no moving platform.

When one or more of the criteria are met the fuser enters moving platform mode and, in some cases, seeks to establish a communication link with one or more external sensors such as a platform IMU as described in more detail below.

When the fuser has moved into moving platform mode it checks at decision 506 whether platform IMU data is available. If not, the fuser operates 508 the entity states and platform states. Since there is little observed data about the platform states these are inferred. Reasonable platform-locked entity tracking 510 is achieved using the entity IMU data and visual tracking data.

At decision point 506, where platform IMU data is available to the fuser the fuser proceeds to check whether world locking is desired at check 512. If world locking is not required, the fuser operates with entity and platform states 514 and using the platform IMU data in addition to the entity IMU data and visual tracking data. The fuser computed platform locked entity tracking 516 with high accuracy despite motion of the platform.

At decision point 512, if world locking is desired, the fuser uses 518 entity states, platform states and states which are in a world reference frame. The fuser computes world-locked entity tracking 520 using the platform IMU data in addition to the entity IMU data and visual tracking data.

Figure 6A:
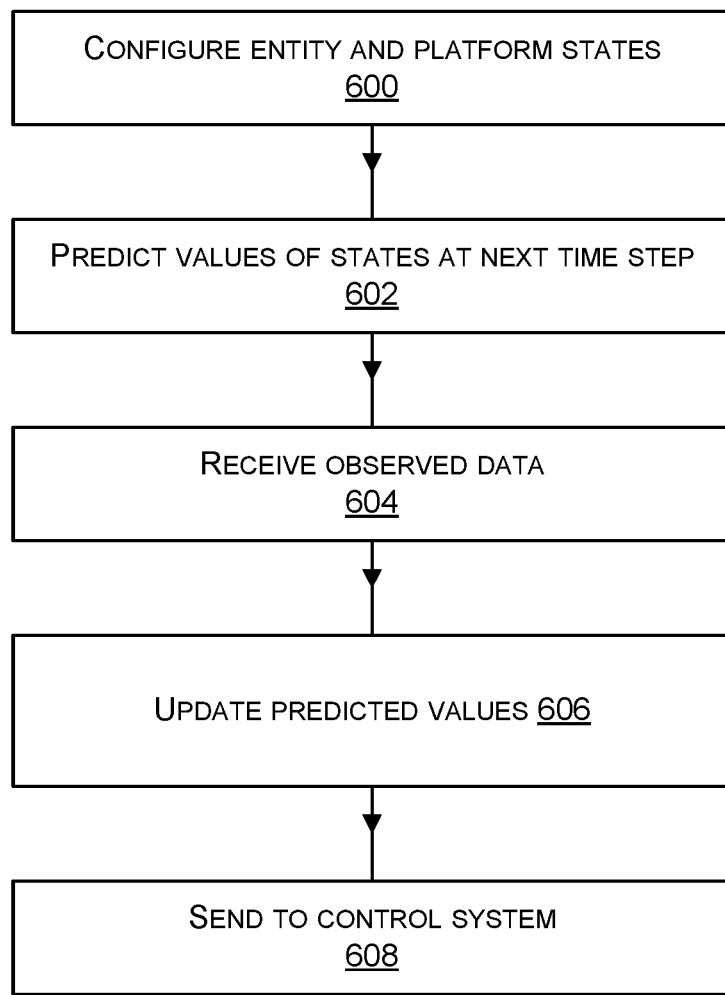
FIG. 6A is a flow diagram of a method performed by a fuser for tracking an entity in a moving platform without external inertial measurement unit data.
Figure 6B:
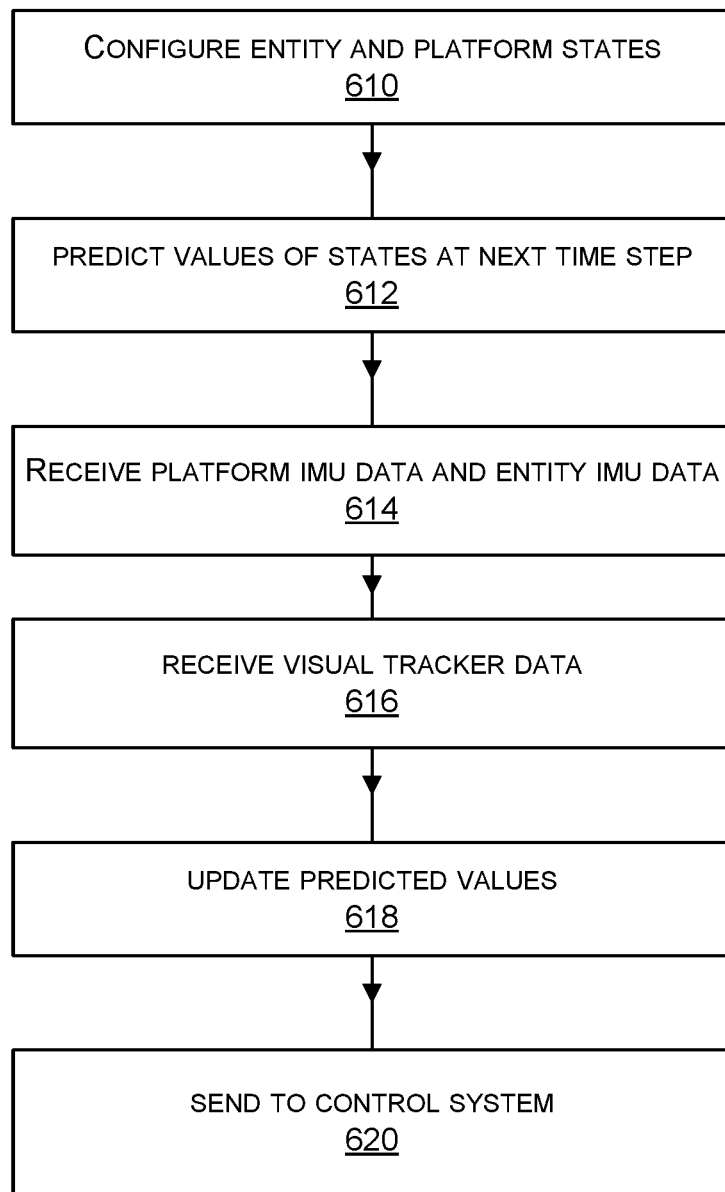
FIG. 6B is a flow diagram of a method performed by a fuser for tracking an entity in a moving platform with external inertial measurement unit data.
Figure 6C:
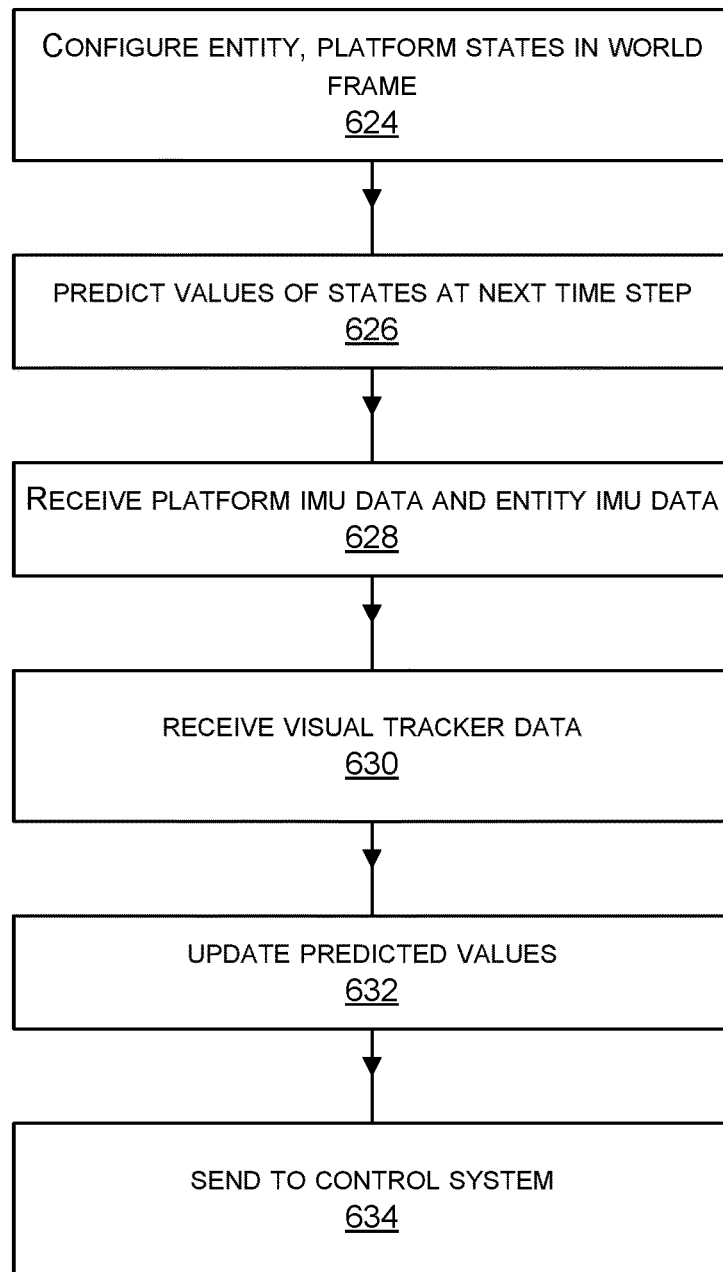
FIG. 6C is a flow diagram of a method performed by a fuser for tracking an entity in a moving platform with external inertial measurement unit data and where states in a world reference frame are used.

In various examples, such as those of FIGS. 6A to 6C, the fuser comprises a Kalman filter. The fuser predicts values of its states at a next time step using physical model equations such as those listed in the table later in this document, and updates covariances as follows:

$$P \leftarrow J*P*J^T + Q$$

J is the Jacobian of the state propagation described the table below listing the physical model equations, linearized at the current estimate of the state, and P is the covariance matrix. Q is the process noise, which describes the accumulating uncertainty when predicting into the future.

This predicted state J and covariance P is then updated based on observed data, such as the observed data received at any of operations 626, 628, 632 of FIGS. 6A to 6C described below. The update equations used to update the predicted state and covariance are:

The innovation, denoted by y, describing the error between the incoming measurement and the anticipated measurement. Various example of types of error which are used are given below.

$$y = \text{SensorMeasurement} - \text{prediction}$$

The innovation covariance, denoted by S, $$S = H*P*H^T + R$$

Where R is the measurement covariance, which is a metric that defines the certainty of the supplied sensor measurement. H is the Jacobian of an update equation (examples of suitable update equations are given below), linearized at the current estimate of the state.

With these the Kalman gain, denoted by K, is calculated:

$$K = P*H^T*S^{-1}$$

Here $S^{-1}$ denotes the inverse of the S matrix.

Finally, the above quantities are used to update the current state and state covariances.

$$P \leftarrow (I - KH)P$$

$$\text{State} \leftarrow \text{State} + Ky$$

Alternative forms of the covariance update are used in some embodiments, such as the "Joseph form" equation. Further the above principals are also functional if the square root variation of the Kalman filter is used, as described in "Estimation with Applications to Tracking and Navigation: Theory, Algorithms and software" chapter 7.2, page 311-316 By Yaakov Bar-Shalom, X. Rong Li and Thiagalingam Kirubarajan, published by Wiley Interscience.

FIGS. 6A to 6C are flow diagrams of methods performed by a fuser such as the fuser of FIG. 1A or FIG. 1B. The following notation is useful in the discussion of FIGS. 6A to 6C.

𝕡 = Platform sensor frame of reference (usually a fixed transform from Map frame m defined below.)

𝕓 = entity frame of reference.

𝕞 = Map frame of reference which is an arbitrary coordinate system currently used by the visual tracker for a model of the environment in the moving platform constructed by the visual tracker from the captured images.

𝕨 = World (or inertial) frame of reference which is a coordinate system connected to the world outside the platform. All marginal effects of planet rotation/solar system rotation are neglected to make the concept of world and inertial frame equivalent.

With reference to FIG. 6A, the fuser configures 600 itself to use entity states and platform states by accessing the states from memory. In the example of FIG. 6A there is no data available from a platform IMU. In an example, the states are:

$Y_{rm}^p$ =SO3 representation of the rotation from map frame to the platform. Translation part held outside of state. An SO3 representation of rotation is a representation in the 3D rotation group which is the group of all rotations about the origin of three-dimensional Euclidean space.

e=Angular velocity of the platform relative to the world (inertial frame). As mentioned above, the term "world (inertial frame)" means a coordinate system in world space which is used by an IMU when making its measurements. In the case of the state e the IMU is not the entity IMU but is an IMU tied to the platform or a fictional IMU tied to the platform which is assumed to exist in order to enable values of e to be inferred.

l=Linear acceleration of the platform relative to the world (inertial frame), and residual linear accelerations.

d=Angular acceleration of the platform relative to the world (inertial) frame.

$X_{rm}^b$ =SE3 transform from the map to the entity frame. This is the "entity position". An SE3 transform is a mapping in three-dimensional Euclidean space. The map frame has already been defined. The entity frame is a coordinate system currently assigned by the visual tracker to the entity.

u=Linear velocity of the entity in the map frame.
w=Angular velocity of the entity in the map frame.
a=Linear acceleration of the entity in the map frame.
r=Angular acceleration of the entity in the map frame.
g=Gravity in world frame (expected to be constant).
W=Gyro biases. These are biases of gyroscopes in the entity IMU.
L=Gyro scale factor. This is a scale factor of a gyroscope in the entity IMU.
A=Accelerometer biases. This is biases of accelerometers in the entity IMU.
C=SO3 extrinsic between IMU and entity. C is a SO3 (a rotation) between the entity IMU and the entity camera frame of reference. This is used to obtain the pose estimated by the visual tracker and the IMU data in the same frame of reference. This value is nearly constant, but the physical entity IMU can move due to the electronics flexing, or the camera could also move due to mechanical impact. So this parameter is optionally a continuously updated calibration parameter It is seen from the list of states above that there are four platform states $Y_{rm}^p$, which is a rotation from the map frame to the platform IMU frame, e which denotes angular velocity of the platform relative to the world (inertial frame), l which denotes linear acceleration of the platform relative to the world (inertial frame), and residual linear accelerations; and d which denotes angular acceleration of the platform relative to the world (inertial frame). The inventors have found that use of these four platform states gives good tracking performance in the case the entity is on a moving platform and even without data from a platform mounted IMU. Each of the four platform states is represented by 3 scalar values (for example l is platform acceleration in x, y and z directions). Thus there are 12 scalar states.

The list of states mentioned above is extended in some examples to include one or more of: gyro biases for one or more external sensors, gyro scale factor for one or more external sensors, accelerometer biases for one or more external sensors.

The fuser stores current values of each of the states in memory. At the beginning of the process when the values of the states are not known the values are set to default values. The fuser updates the values of the states in the light of the incoming data from the entity IMU and the visual tracker. The updates are computed by computing predicted values of each of the states at a next time step using physical model equations. The predicted values are then compared with the observed data from the visual tracker and entity IMU and the comparison is used to compute updates to the states using update equations.

With reference to FIG. 6A the fuser configures entity and platform states by retrieving them from memory or setting them to default values. The fuser predicts 602 values of the states at a next time step by using physical model equations listed below. When performing this prediction, the covariances of the variables are updated. Partial derivatives (also referred to as Jacobians) of the equations are used in the covariance update and are either numerically calculated with a finite difference gradient calculation or using closed form derivatives.

The fuser receives 604 observed data which in this example involves receiving the entity IMU data the visual tracker data. The fuser updates 606 the predicted values of the states using update equations described later in this document.

An example of the physical model equations is now given which are used for predicting values of the states at a next time step.

$$Y_{rm}^p \leftarrow Y_{rm}^p$$

$$e \leftarrow e + d \cdot dt$$

$$l \leftarrow e^{(dt \cdot ln(\alpha_{plat}))} \cdot l \text{ "e" here is the constant "Euler's number"}$$

$$d \leftarrow d$$

$$X_{rm}^b \leftarrow \exp_{se3}\left(\begin{bmatrix} u \\ w \end{bmatrix} \cdot dt + 0.5 \cdot \begin{bmatrix} a \\ r \end{bmatrix} \cdot dt^2\right) * X_{rm}^b$$

$$u \leftarrow u + a \cdot dt$$

$$w \leftarrow w + r \cdot dt$$

$$a \leftarrow e^{(dt \cdot ln(\alpha_{entity}))} \cdot a \text{ "e" here is the constant "Euler's number"}$$

$$r \leftarrow e^{(dt \cdot ln(\alpha_{entity}))} \cdot r \text{ "e" here is the constant "Euler's number"}$$

$$g \leftarrow \exp_{so3}(dt \cdot (Y_{rm}^p)^{-1} * (e + 0.5 \cdot dt \cdot d)) * g$$

$$W, L, A, C \leftarrow W, L, A, C$$

Where $\exp_{se3/so3}()$ represents the exponential map that takes se(3) to SE(3), or, so(3) to SO(3), whichever is appropriate. The symbol "*" represents a Matrix multiply, "·" is a scalar multiply, whether scalar-scalar or scalar-matrix. "dt" is the time since the last update.

The updated values of the states are output and sent to a control system 608 such as any of the downstream apparatus 122 of FIGS. 1A and B. As described above, the states include a position and orientation $X_{rm}^b$ of the entity.

In the following example update equations the following notation is used. The term "dist" is a vector from the platform IMU to the entity in the platform frame. Y is an SO3 quantity, though the vector required to form the equivalent SE3 quantity is held outside of the state. Super script "T" defines the transpose of the quantity below it. For SO3 quantities this is the same as the inverse rotation transform.

Examples of the update equations are now given.

$$\text{prediction} = L*(-w - SO3(X)*(Y)^{T}*e) + W$$

Which is expressed in words as the predicted value of the entity IMU gyro measurement is equal to the entity gyro scale factor L times a negative of the angular velocity of the entity w minus a matrix multiplication of the SO3 quantity of the entity position X, the transpose of the rotation from the map frame to the platform Y and the angular velocity e of the platform relative to the world (inertial frame); plus the entity IMU bias W. The values of the states in the above equation are updated so as to make the prediction closer to the observed value of the entity IMU gyro measurement.

The observation of the entity IMU acceleration is compared to the following prediction and the states are updated to make the prediction closer to the observed value.

$$\text{prediction} = -a - (u \times w) - SO3(X)*g - SO3(X)*Y^{T}*l + A - \text{centripetal-euler-coriolis}$$

$$\text{centripetal} = -SO3(X)*(Y)^{T}*(e \times (e \times \text{dist}))$$

$$\text{euler} = -SO3(X)*(Y)^{T}*(d \times \text{dist})$$

$$\text{coriolis} = -2 \cdot SO3(X)*(Y)^{T}*(e \times (Y*SO3(X)^{T}*u))$$

Which is expressed in words as, the predicted value of the entity IMU acceleration is equal to a negative of the product of the entity linear velocity u in the map frame and the angular velocity of the entity w in the map frame, minus the acceleration a, minus the product of the entity linear velocity and the entity angular velocity, minus the SO3 quantity of the entity position X matrix multiplied with gravity g in the world frame, minus the matrix multiplication of the SO3 quantity of the entity position X, the transpose of the rotation from the map frame to the platform Y and the linear acceleration of the platform 1, plus the accelerometer biases, minus second order effects. The second order effects are denoted by the words "centripetal, Euler, Coriolis" and are defined as stated above. In this example l holds the linear acceleration of the platform as well as the centripetal term for the platform (v×e) where v is the linear velocity of the platform, which is not estimated directly in this example. In other examples, where the platform reports its velocity, acceleration and pose to the entity v is estimated, and l is broken up into its constituent parts.

The update equations mentioned above are computed using Jacobians (partial derivatives) of the variables. The Jacobians are computed numerically using finite difference differentiation or found in their closed form.

In the example of FIG. 6B the fuser configures 610 entity and platform states by accessing values of these states from memory and/or using default values. The fuser predicts 612 values of the entity and platform states at a next time step using physical model equations as described above. The fuser receives 614 entity IMU data and platform IMU data. The fuser determines a coordinate frame of the platform IMU as explained with reference to FIG. 7. The fuser receives 616 visual tracker data comprising position and orientation of the entity. The fuser computes updated predicted values of the states 618 to give an output pose (3D position and orientation) and parameters of the entity. The output 3D position and orientation, and parameters are sent 620 to a control system such as any of the downstream apparatus 122 of FIG. 1A.

In the situation of FIG. 6B the fuser uses states and physical model equations as explained above for FIG. 6A. It uses update equations as explained for FIG. 6A and in addition has update equations that make use of the observed data from the platform IMU. An example is now given.

The observation of the platform IMU accelerometer is compared to the following prediction and the states are updated to make the prediction closer to the observed value $$\text{prediction} = -l - Y*g$$

Which is expressed in words as the predicted value of the platform IMU accelerometer is equal to the negative of the platform linear acceleration, minus the matrix multiplication of the SO3 frame to frame rotation and the gravity in map.

With reference to FIG. 6C an example is given where the fuser outputs world locked data. Using the method of FIG. 6C the output 3D position and orientation and parameters are usable to trigger display of a hologram outside the moving platform using the tracked 3D position and orientation, such that the hologram appears locked to an environment outside the moving platform from the a view point of the entity. In an example the entity is a head mounted display worn by a passenger in a vehicle and the hologram is world locked and appears outside the vehicle. The fuser uses the states of FIG. 6A except that the state $Y_m^P$ is now in a world frame and represents an orientation of a platform IMU. The fuser also uses an additional state V which denotes a velocity of the platform IMU. The fuser configures 624 the entity and platform states for a world frame. The fuser predicts 626 values of the states at a next time step using physical model equations as explained above.

As for FIG. 6B, the fuser receives 628 entity IMU data and receives platform IMU data. The fuser determines a coordinate frame of the platform IMU as described with reference to FIG. 7. The fuser receives visual tracker data 630 as for FIG. 6B.

The fuser updates 632 the predicted values of the states using the observed data from operations 628 and 630 using update equations.

The update equations are $$P \leftarrow (I - KH)P$$

$$\text{State} \leftarrow \text{State} + Ky$$

as explained in detail above.

The resulting state values are sent to a control system in operation 634 such as to a downstream apparatus 122 of FIG. 1A.

Figure 7:
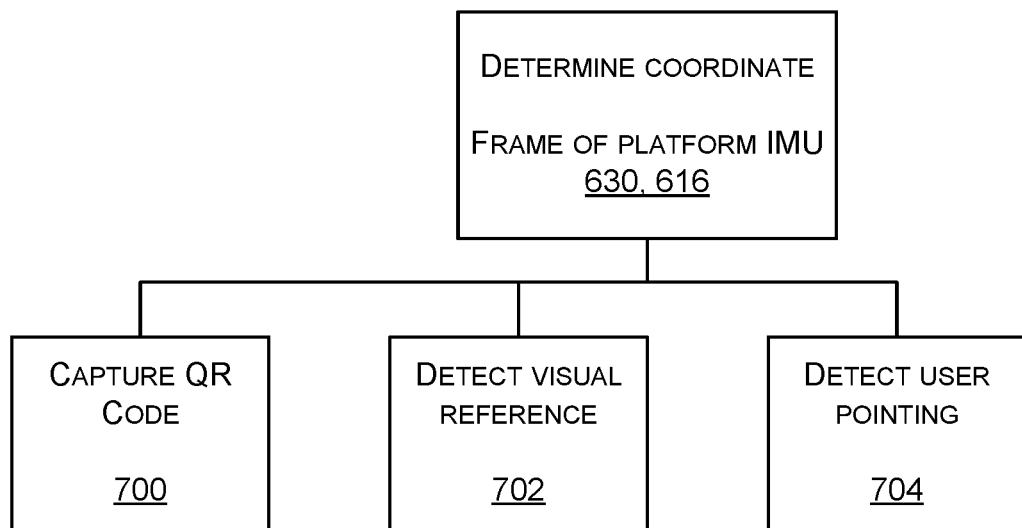
FIG. 7 is a flow diagram of a method of determining a coordinate frame of a platform inertial measurement unit.

FIG. 7 is a flow diagram illustrating different ways of determining 616, 630 a coordinate frame of the platform IMU which may be used by the fuser. In some examples, the image capture device is used to capture 700 a quick response (QR) code which contains the coordinate frame of the platform IMU. The QR code is displayed at a display on the moving platform. In an example the QR code is displayed on a display screen of a mobile computing device containing the platform IMU. Using a QR code to transfer the coordinate frame is an accurate an efficient way to enable the fuser to determine the platform IMU coordinate frame. In an example the code visually defines a coordinate system of the second inertial measurement unit such as where the code is a QR code and an x and y axis are defined along edges of the QR code and a z axis is defined into the QR code.

In some examples the image capture device captures images of the moving platform and/or entity and the images are analyzed to detect 702 known visual references associated with platform IMUs. When the visual tracker detects a visual reference it is able to access stored information detailing the coordinate frame of the associated platform IMU.

In some examples a user points at the platform IMU and the image capture device captures images depicting the user pointing at the platform IMU or depicting a user gesturing towards the platform IMU. The user is detected as pointing 704 or gesturing. The visual tracker computes the pointing direction or gesturing direction and so determines a position and coordinate frame of the platform IMU.

In some examples a user gazes at the platform IMU and the image capture device or other sensors on the entity detect the gaze location which is then used to determine the position and coordinate frame of the platform IMU.

Figure 8:
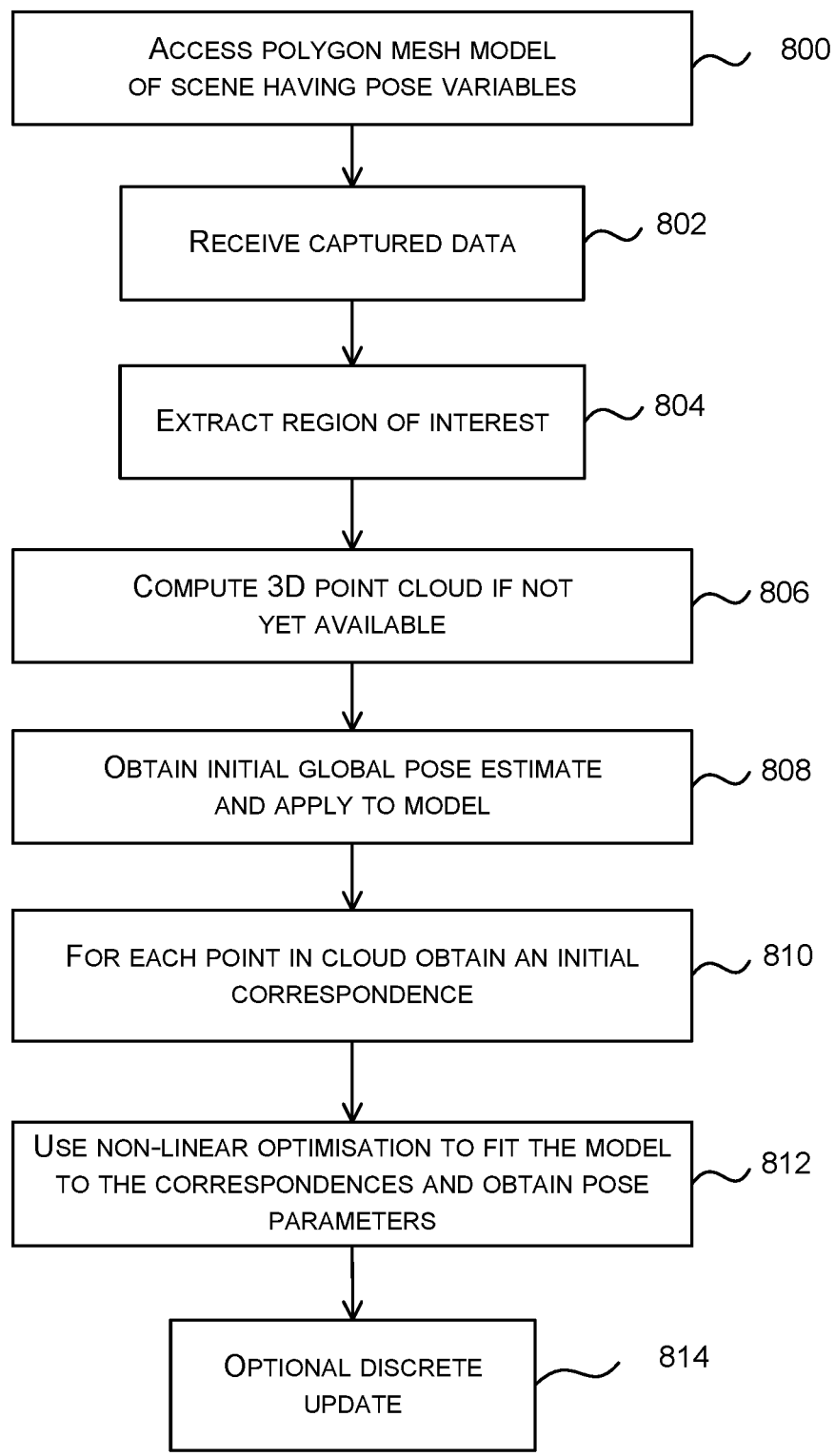
FIG. 8 is a flow diagram of a method performed by a visual tracker.

FIG. 8 is a flow diagram of a method performed by a visual tracker such as the visual tracker of FIG. 1A.

The inventors have tested the fuser and found that it gives improvements in reliability. The fuser deployment of FIG. 1A was tested (i.e. the fuser without input from a platform IMU) for the case where the entity is a HoloLens and the visual tracker and fuser are integral with the HoloLens. The same fuser deployment was tested for the case where no platform states are taken into account by the fuser. In both cases the testing was carried out on a moving platform with the same moving platform motion.

| | Platform states used by fuser | Platform states not used by fuser |
|---|---|---|
| Reliability | 99.8 | 29.390 |

Reliability—The percentage of times a virtual hologram was able to be generated when tried; low reliability generally indicates a loss of visual tracking.

FIG. 8 is a flow diagram of an example method of operation at the visual tracker of FIG. 1A. The tracker accesses 800 a 3D model of the scene on the moving platform such as a polygon mesh model.

The tracker receives captured data 802 depicting the moving platform as viewed by the entity or depicting the moving platform and the entity. For example, the captured data 802 is a 3D point cloud, a depth map, one or more frames of raw time of flight data, color image data or other captured data. Optionally the tracker extracts 804 a region of interest from the captured data where the region of interest depicts the entity to be tracked rather than other parts of the scene or environment of the moving platform.

In some examples, where the region of interest comprises parts of a depth map, the tracker computes 806 a 3D point cloud by back projecting the region of interest. In some cases, a 3D point cloud is already available. In some cases, no 3D point cloud is used.

The tracker obtains 808 an initial global pose estimate (which is six degree of freedom position and orientation) from historical data or default values and applies it to the model.

Optionally the tracker obtains 810 initial correspondence estimates. A correspondence estimate is an indication of a 3D point on the surface of the model corresponding to a captured data point.

In some examples a correspondence is a tuple of values denoted by the symbol u in this document, which specifies a point on a surface referred to herein as a Phong surface, which is an approximation to a smooth surface derived from the rigged polygon mesh but without the need for computing a limit surface. A defining function S is stored at the tracker in some examples and is a function which takes as its input a correspondence u and the pose parameters θ. The defining function S computes a 3D position in the world that point u on the Phong surface corresponds to. In an example, polygon indices are stored on disk, and the defining function S which is implemented in code, is also stored on disk. The defining function S uses the polygon indices alongside the mesh posing implementation to evaluate the surface by interpolating between the vertices given by the polygon indices.

The tracker obtains 810 a plurality of initial correspondence estimates, for example, one for each point in the point cloud, or one for each of a plurality of captured data points. The tracker obtains 810 the initial correspondence estimates by selecting them at random or by using machine learning, or by choosing a closest point on the model given the initial estimate of the global pose, using combinations of one or more of these approaches, or in other ways. In the case that machine learning is used a machine learning system has been trained using a large amount of training data to derive a direct transformation from image data to 3D model points.

The tracker computes an optimization 812 to fit the model to the captured data. For example, the tracker computes the following minimization beginning from the initial values of the correspondence estimates and the pose parameters where these are available (or beginning from randomly selected values)

$$\min_{\theta, u_1, \ldots u_n} \sum_{i=1}^{n} \psi(\|x_i - S(u_i; \theta)\|) + \psi^\top(\|x_i^\top - S^\top(u_i; \theta)\|)$$

Which is expressed in words as a minimum over the pose parameters θ and n values of the correspondences u of the sum of a robust kernel ψ(.) applied to the magnitude of the difference between a 3D point cloud point $x_i$ and a corresponding 3D surface point $S(u_i; \theta)$, and a different robust kernel $\psi^T(.)$ applied to the magnitude of the difference between a 3D point cloud normal $x_i^T$ and a corresponding 3D surface normal $S^T(u_i; \theta)$. The 3D surface point in this equation lies on a rigged polygon mesh, while the 3D surface normal is an approximation to the geometric normal of a smooth surface such as a subdivision surface. The surface, referred to herein as a Phong surface, is not computed in its entirety; rather particular parts of the Phong surface are computed as and when needed. The corresponding 3D surface points given by $S(u_i; \theta)$, and the corresponding 3D surface normals $S^T(u_i; \theta)$ are efficient to compute in the approximate (Phong) surface case. The 3D Phong surface normal is computed by computing approximate surface normals along it as described in detail with reference to FIGS. 4 to 6. Where the robust kernels ψ(.) and $\psi^T(.)$ are a Geman-McClure kernel, a Huber kernel, a Quadratic kernel or other kernel.

The optimization enables correspondence estimation and model fitting to be unified since the minimization searches over possible values of the correspondences u and over possible values of the pose parameters θ. This is found to give better results than an alternative approach of using alternating stages of model fitting and correspondence estimation.

The optimization is non-linear in some examples. The result of the optimization is a set of values of the pose parameters θ including the global pose parameters and the joint positions.

Because the model has a continuous normal approximation it is possible to compute the optimization using a non-linear optimization process. For example, a gradient-based process which exploits the fact that rate of change of both surface position and surface orientation does not change substantially across edges in a good approximation to a smooth surface, such as the Phong surface. Jacobian optimization methods are used in some examples. This improves speed of processing. A discrete update operation is optionally used together with the optimization. This involves using the continuous optimization as mentioned above to update both the pose and the correspondences together, and then using a discrete update to re-set the values of the correspondences using the captured sensor data. The discrete update allows the correspondences to jump efficiently from one part of the model surface to another.

The process of FIG. 8 is optionally repeated, for example as new captured data arrives as part of a stream of captured data.

Figure 9:
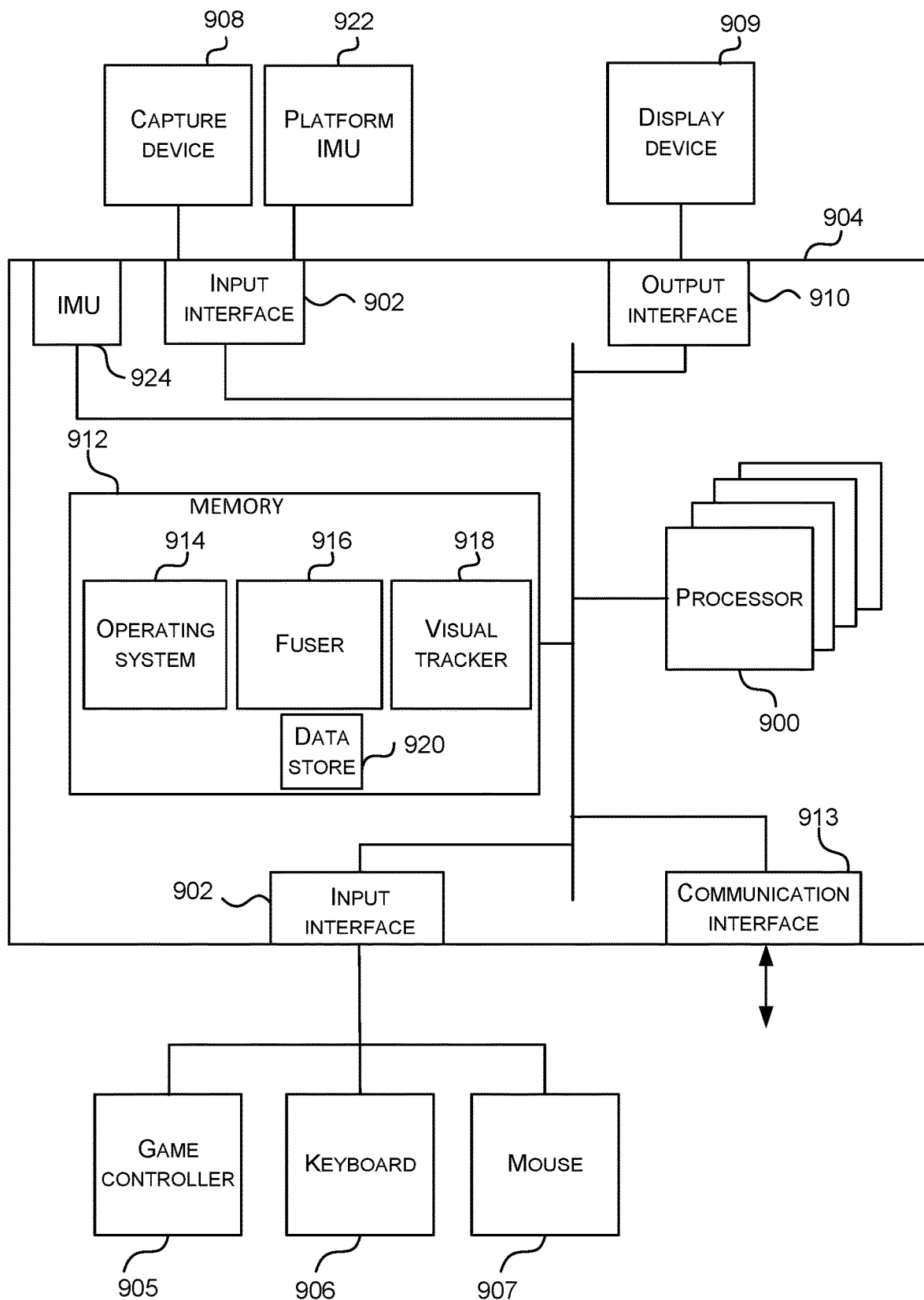
FIG. 9 illustrates an exemplary computing-based device in which embodiments of a fuser are implemented.

FIG. 9 illustrates various components of an exemplary computing-based device 904 which may be implemented as any form of a computing and/or electronic device, and in which embodiments of a tracker for tracking 3D position and orientation of an entity on a moving platform are implemented. In some cases the computing-based device is a head worn computer. In some cases the computing-based device is a drone or robot.

Computing-based device 904 comprises one or more processors 900 which are microprocessors, controllers or any other suitable type of processors for processing computer executable instructions to control the operation of the device in order to compute values of position and orientation of an entity (which may be the computing-based device itself) on a moving platform. In some examples, for example where a system on a chip architecture is used, the processors 900 include one or more fixed function blocks (also referred to as accelerators) which implement a part of the method of computing values of pose parameters in hardware (rather than software or firmware). Platform software comprising an operating system 914 or any other suitable platform software is provided at the computing-based device. Fuser 916 takes input from visual tracker 918 as well as from an IMU 924 (entity IMU) mounted on the computing-based device 904. A data store 920 holds values of states, physical model equations, update equations and other data. Visual tracker 918 implements the method of FIG. 8 to compute position and orientation of an entity from image data.

The computer executable instructions are provided using any computer-readable media that is accessible by computing based device 904. Computer-readable media includes, for example, computer storage media such as memory 912 and communications media. Computer storage media, such as memory 912, includes volatile and non-volatile, removable and non-removable media implemented in any method or technology for storage of information such as computer readable instructions, data structures, program modules or the like. Computer storage media includes, but is not limited to, random access memory (RAM), read-only memory (ROM), erasable programmable read only memory (EPROM), electrically erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is usable to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 912) is shown within the computing-based device 904 it will be appreciated that the storage is optionally distributed or located remotely and accessed via a network or other communication link (e.g. using communication interface 913).

The computing-based device 904 comprises one or more input interfaces 902 arranged to receive and process input from one or more devices such as a platform IMU mounted on the moving platform, and a capture device 908 which is either mounted on the computing-based device or is mounted on a surface in an environment of the computing-based device. The capture device 908 is an image capture device as described with reference to FIG. 1A. The input interface 902 also takes input from user input devices, such as a game controller 905, a keyboard 906, a mouse 907 depending on the situation the computing-based device is being used for. This user input may be used to control games, medical software, or other software applications, to set values of parameters and for other purposes. In some examples the computing-based device 904 is arranged to provide pose tracking at interactive rates.

The computing-based device 904 also comprises an output interface 910 arranged to output display information to a display device 909 which can be separate from or integral to the computing device 904. Where the computing-based device is a head mounted display the display device is one or more projectors which project light into pupils of a wearer. The display information may provide a graphical user interface. The output interface 910 may also output data to a downstream apparatus such as those described with reference to FIG. 1A.

Alternatively, or in addition to the other examples described herein, examples include any combination of the following:

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A method comprising:
    setting an entity state and a platform state for an entity in a moving platform;
    predicting a next entity state value and a next platform state value at a next time step;
    receiving, from an inertial measurement unit (IMU) on the entity in the moving platform, data sensed by the IMU;
    updating the predicted next entity state value and the predicted next platform state value based on the received data sensed by the IMU; and
    tracking the moving platform using the updated predicted next entity state value and the updated predicted next platform state value.

2. The method of claim 1, further comprising:
    receiving, from another IMU on the moving platform, data sensed by the other IMU,
    wherein updating the predicted next entity state value and the predicted next platform state value is based on the received data sensed by the IMU and the data sensed by the other IMU.

3. The method of claim 1, further comprising:
    receiving, from an image capture device mounted on the entity or the moving platform, visual tracker data,
    wherein updating the predicted next entity state value and the predicted next platform state value is based on the received data sensed by the IMU and the received visual tracker data.

4. The method of claim 3, further comprising:
    receiving, from another IMU on the moving platform, data sensed by the other IMU,
    wherein updating the predicted next entity state value and the predicted next platform state value is based on the received data sensed by the IMU, the received visual tracker data, and the data sensed by the other IMU.

5. The method of claim 4, further comprising:
    computing a 3-dimensional (3D) position and orientation of the entity; and
    displaying a hologram outside the moving platform using the computed 3D position and orientation, the hologram appearing locked to an environment outside the moving platform from a view point of the entity.

6. The method of claim 5, wherein the hologram is world locked.

7. The method of claim 1, wherein the entity is a head mounted display worn by a passenger in a vehicle.

8. A system comprising:
    a processor; and
    a computer storage memory having computer-executable instructions stored thereon which, when executed by the processor, implement a method comprising:
        setting an entity state and a platform state for an entity in a moving platform;
        predicting a next entity state value and a next platform state value at a next time step;
        receiving, from an inertial measurement unit (IMU) on the entity in the moving platform, data sensed by the IMU;
        updating the predicted next entity state value and the predicted next platform state value based on the received data sensed by the IMU; and
        tracking the moving platform using the updated predicted next entity state value and the updated predicted next platform state value.

9. The system of claim 8, wherein the computer-executable instructions when executed by the processor further implement the method comprising:
    receiving, from another IMU on the moving platform, data sensed by the other IMU,
    wherein updating the predicted next entity state value and the predicted next platform state value is based on the received data sensed by the IMU and the data sensed by the other IMU.

10. The system of claim 8, wherein the computer-executable instructions when executed by the processor further implement the method comprising:
    receiving, from an image capture device mounted on the entity or the moving platform, visual tracker data,
    wherein updating the predicted next entity state value and the predicted next platform state value is based on the received data sensed by the IMU and the received visual tracker data.

11. The system of claim 10, wherein the computer-executable instructions when executed by the processor further implement the method comprising:
  receiving, from another IMU on the moving platform, data sensed by the other IMU,
  wherein updating the predicted next entity state value and the predicted next platform state value is based on the received data sensed by the IMU, the received visual tracker data, and the data sensed by the other IMU.

12. The system of claim 10, wherein the computer-executable instructions when executed by the processor further implement the method comprising:
  computing a 3-dimensional (3D) position and orientation of the entity; and
  displaying a hologram outside the moving platform using the computed 3D position and orientation, the hologram appearing locked to an environment outside the moving platform from a view point of the entity.

13. The system of claim 12, wherein the hologram is world locked.

14. The system of claim 8, wherein the entity is a head mounted display worn by a passenger in a vehicle.

15. A computer storage memory having computer-executable instructions stored thereon which, when executed by a processor, implement a method comprising:
  setting an entity state and a platform state for an entity in a moving platform;
  predicting a next entity state value and a next platform state value at a next time step;
  receiving, from an inertial measurement unit (IMU) on the entity in the moving platform, data sensed by the IMU;
  updating the predicted next entity state value and the predicted next platform state value based on the received data sensed by the IMU; and
  tracking the moving platform using the updated predicted next entity state value and the updated predicted next platform state value.

16. The computer storage memory of claim 15, wherein the computer-executable instructions when executed by the processor further implement the method comprising:
  receiving, from another IMU on the moving platform, data sensed by the other IMU,
  wherein updating the predicted next entity state value and the predicted next platform state value is based on the received data sensed by the IMU and the data sensed by the other IMU.

17. The computer storage memory of claim 15, wherein the computer-executable instructions when executed by the processor further implement the method comprising:
  receiving, from an image capture device mounted on the entity or the moving platform, visual tracker data,
  wherein updating the predicted next entity state value and the predicted next platform state value is based on the received data sensed by the IMU and the received visual tracker data.

18. The computer storage memory of claim 17, wherein the computer-executable instructions when executed by the processor further implement the method comprising:
  receiving, from another IMU on the moving platform, data sensed by the other IMU,
  wherein updating the predicted next entity state value and the predicted next platform state value is based on the received data sensed by the IMU, the received visual tracker data, and the data sensed by the other IMU.

19. The computer storage memory of claim 17, wherein the computer-executable instructions when executed by the processor further implement the method comprising:
  computing a 3-dimensional (3D) position and orientation of the entity; and
  displaying a hologram outside the moving platform using the computed 3D position and orientation, the hologram appearing locked to an environment outside the moving platform from a view point of the entity.

20. The computer storage memory of claim 15, wherein the entity is a head mounted display worn by a passenger in a vehicle.

* * * * *